United States Patent [19]
Connelly

[11] Patent Number: 6,144,376
[45] Date of Patent: *Nov. 7, 2000

[54] METHOD AND APPARATUS FOR MERGING, DISPLAYING AND ACCESSING PERSONAL COMPUTER CONTENT LISTINGS VIA A TELEVISION USER INTERFACE

[75] Inventor: Jay Connelly, Portland, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/749,792

[22] Filed: Nov. 15, 1996

[51] Int. Cl.$^7$ ...................................................... H04N 7/10
[52] U.S. Cl. ............................ 345/327; 348/552; 348/906
[58] Field of Search .................................... 348/7, 10, 12, 348/13, 552, 906; 395/327, 328; 709/217–219

[56] References Cited

U.S. PATENT DOCUMENTS

| | | | |
|---|---|---|---|
| 5,148,154 | 9/1992 | MacKay et al. ........................ | 340/712 |
| 5,230,063 | 7/1993 | Hoeber et al. .......................... | 395/156 |
| 5,359,367 | 10/1994 | Stockhill ............................... | 348/552 |
| 5,404,393 | 4/1995 | Remillard ............................... | 379/96 |
| 5,412,773 | 5/1995 | Carlucci ................................. | 395/156 |
| 5,490,208 | 2/1996 | Remillard ............................... | 379/96 |
| 5,550,576 | 8/1996 | Klosterman ............................ | 348/6 |
| 5,561,708 | 10/1996 | Remillard ............................... | 379/96 |
| 5,801,787 | 9/1998 | Schein et al. ...................... | 348/906 X |
| 5,861,881 | 1/1999 | Freeman et al. ....................... | 345/302 |
| 5,862,324 | 1/1999 | Collins .................................. | 395/200 |
| 5,864,537 | 1/1999 | Hijikata ................................. | 370/235 |
| 5,887,243 | 3/1999 | Harvey et al. .......................... | 455/3.1 |
| 5,892,508 | 4/1999 | Howe et al. ............................ | 345/327 |
| 5,897,623 | 4/1999 | Fein et al. .............................. | 705/27 |
| 5,905,523 | 5/1999 | Woodfield et al. ...................... | 348/12 |
| 5,907,322 | 5/1999 | Kelly et al. ............................ | 345/327 |
| 5,940,073 | 8/1999 | Klosterman et al. ................... | 345/327 |
| 5,959,688 | 9/1999 | Schein et al. ...................... | 348/906 X |
| 5,995,155 | 11/1999 | Schindler et al. ................. | 348/906 X |

OTHER PUBLICATIONS

"Remote–Controlled Computing on a 31–inch Screen", Matt Rosoff, Feb. 19, 1996, 2 pp.
"What Larry and Lou know (that you don't)", Robert Seidman, Jan. 29, 1996, 2 pp.
"The $500 Web Box", Susan Stellin, 1996, 2 pp.

*Primary Examiner*—Nathan Flynn
*Attorney, Agent, or Firm*—Blakely, Sokoloff, Taylor & Zafman LLP

[57] ABSTRACT

A method and apparatus for merging, displaying and accessing PC content listings via a television user interface are disclosed. At least one PC content listing is formatted into a television content listing format and the PC content listing is then displayed on a display device. According to one aspect of the invention, the PC content listing may be merged with at least one television content listing. According to another aspect of the invention, a command is input into a remote control, the command is transmitted from the remote control to a processing unit, the processing unit interprets the command into a corresponding action, and the corresponding action is executed to present PC content listings on a display device via a television user interface.

24 Claims, 9 Drawing Sheets

DISPATCHER 510

| CHANNEL | ACTIVITY | POINTER |
|---|---|---|
| 2 | TV CHANNEL | CURRENT |
| 4 | TV CHANNEL | - |
| 5 | TV CHANNEL | - |
| 9 | ON-LINE GAME | - |
| 10 | WEB PAGE | - |

METHOD AND APPARATUS FOR MERGING, DISPLAYING AND ACCESSING PERSONAL COMPUTER CONTENT LISTINGS VIA A TELEVISION USER INTERFACE

FIELD OF THE INVENTION

The present invention relates to the field of computing. Specifically, the present invention discloses a method and apparatus for merging, displaying and accessing personal computer (PC) content listings via a television user interface.

DESCRIPTION OF RELATED ART

Currently, home PCs are used for only a few hours a day. This is true despite the recent growth of applications and advances in networking technology that have made the World Wide Web ("the Web") increasingly popular to a large segment of the population. Many people are intimidated by the non-intuitive PC user interface, such as a Microsoft Windows™ user interface, that requires specialized PC knowledge. For example, a Microsoft Windows™ user is generally familiar with concepts such as point and click, double clicking and pull down menus. These concepts are not intuitive for a novice user who has little or no PC experience. As such, many users who may otherwise be able to derive value from a PC, including accessing the Web, are currently inhibited by their lack of PC knowledge, and/or their lack of interest in learning how to use the existing PC user interfaces in order to access PC content.

FIG. 1A illustrates an example of the current PC content access model. PC 100 includes a display 105 that comprises window 110 (including buttons 1–5), icons 1 and 2 and cursor 115. Cursor 115 is associated with mouse 125 that controls the activity within display 105. Icon 1 allows users to discard information by "dragging" a visual image of the information into the visual image of the trash can, or by selecting a "delete" option in an application, where available.

Icon 2 represents an application which a user may open by single or double clicking on the visual image of the icon in a manner well-known in the art. Once the application is activated, an application window such as window 110 may appear. If the user then desires to select button 1 within window 110, the user utilizes mouse 125 to send commands to PC 100. The user selects button 1 by positioning cursor 115 over button 1 of window 110 and single or double clicking on the button. The single or double clicking action activates button 1 to perform specific tasks associated with button 1.

Although the single and double clicking action described above is well known in the art, the action is not intuitive to a novice user, and has to be learned in order for the user to be productive. As described above, this learning intimidates a number of potential PC users and discourages users from accessing the PC content via currently available access methods.

It is therefore desirable to have an intuitive user interface that provides a high degree of user friendliness for people who lack computer experience. One example of an intuitive user interface that a large percentage of people are familiar with is illustrated in FIG. 1B. TV 150 includes display 155 on which a user may display a selected channel via different commands through remote control 175. For example, in order to view content on a TV, a user may simply press a button on remote control 175 that indicates "channel up" or "channel down." This automatically displays the next channel up or down from the channel that the user is currently watching. This television user interface is one that is widely known and used and one that is easily and intuitively learned by users. Availability of this type of an intuitive user interface for the PC would therefore enable novice users to use PC functionality and encourage them to access PC content on a more regular basis. In addition to the intuitive user interface, a television also provides the advantage of generally being in a family room, where many people spend most of their time, rather than in a den or a work space, where most households have PCs.

SUMMARY OF THE INVENTION

The present invention discloses a method and apparatus for merging, displaying and accessing PC content listings via a television user interface. At least one PC content listing is formatted into a television content listing format and the PC content listing is then displayed on a display device. According to one aspect of the invention, the PC content listing may be merged with at least one television content listing. According to another aspect of the invention, a command is input into a remote control, the command is transmitted from the remote control to a processing unit, the processing unit interprets the command into a corresponding action, and the corresponding action is executed to present PC content on a display device via a television user interface.

Other objects, features and advantages of the present invention will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE PREFERRED EMBODIMENT

The present invention relates to a method and apparatus for merging, displaying and accessing PC content listings via a television user interface. "PC content" in the context of this application include Internet listings, Web sites, local or on-line games and any other PC content available to PC users. It will be apparent to one of ordinary skill in the art that the presently claimed invention is also applicable to numerous other types of PC content. In the following detailed description, numerous specific details are set forth in order to provide a thorough understanding of the present invention. It will be apparent to one of ordinary skill in the art, however, that these specific details need not be used to practice the present invention. In other instances, well-known structures, interfaces and processes have not been shown in detail in order not to unnecessarily obscure the present invention.

Figure 1A:
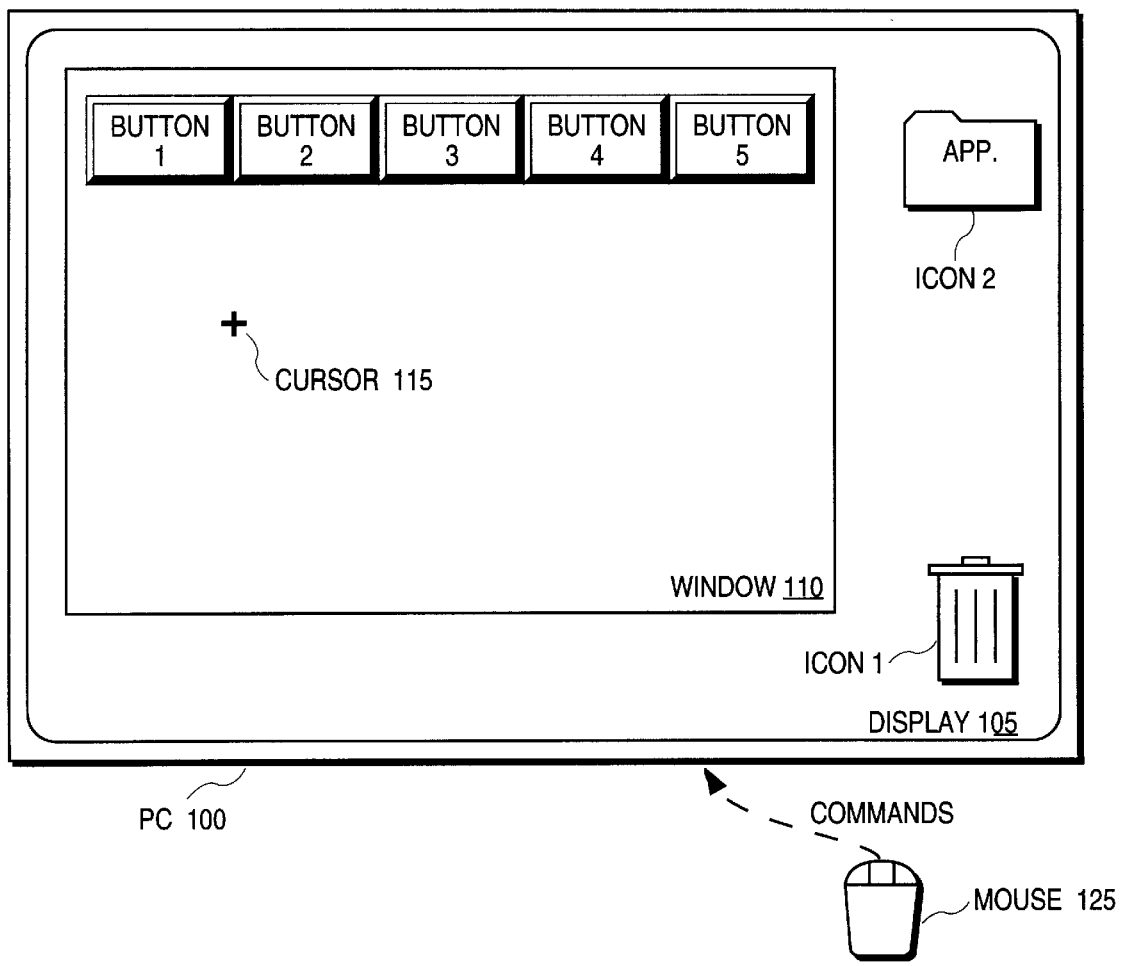
FIG. 1A illustrates a prior art PC user interface.
Figure 1B:
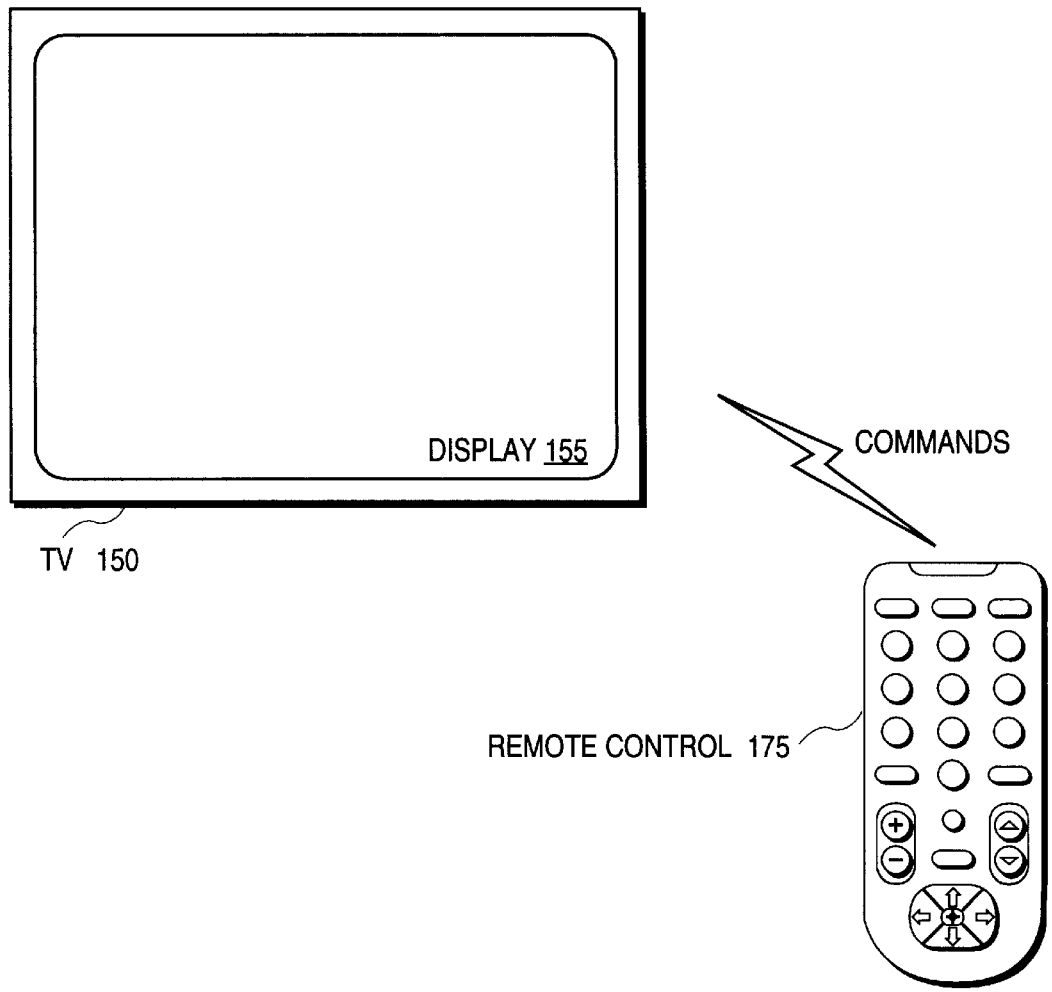
FIG. 1B illustrates a prior art television user interface.
Figure 2:
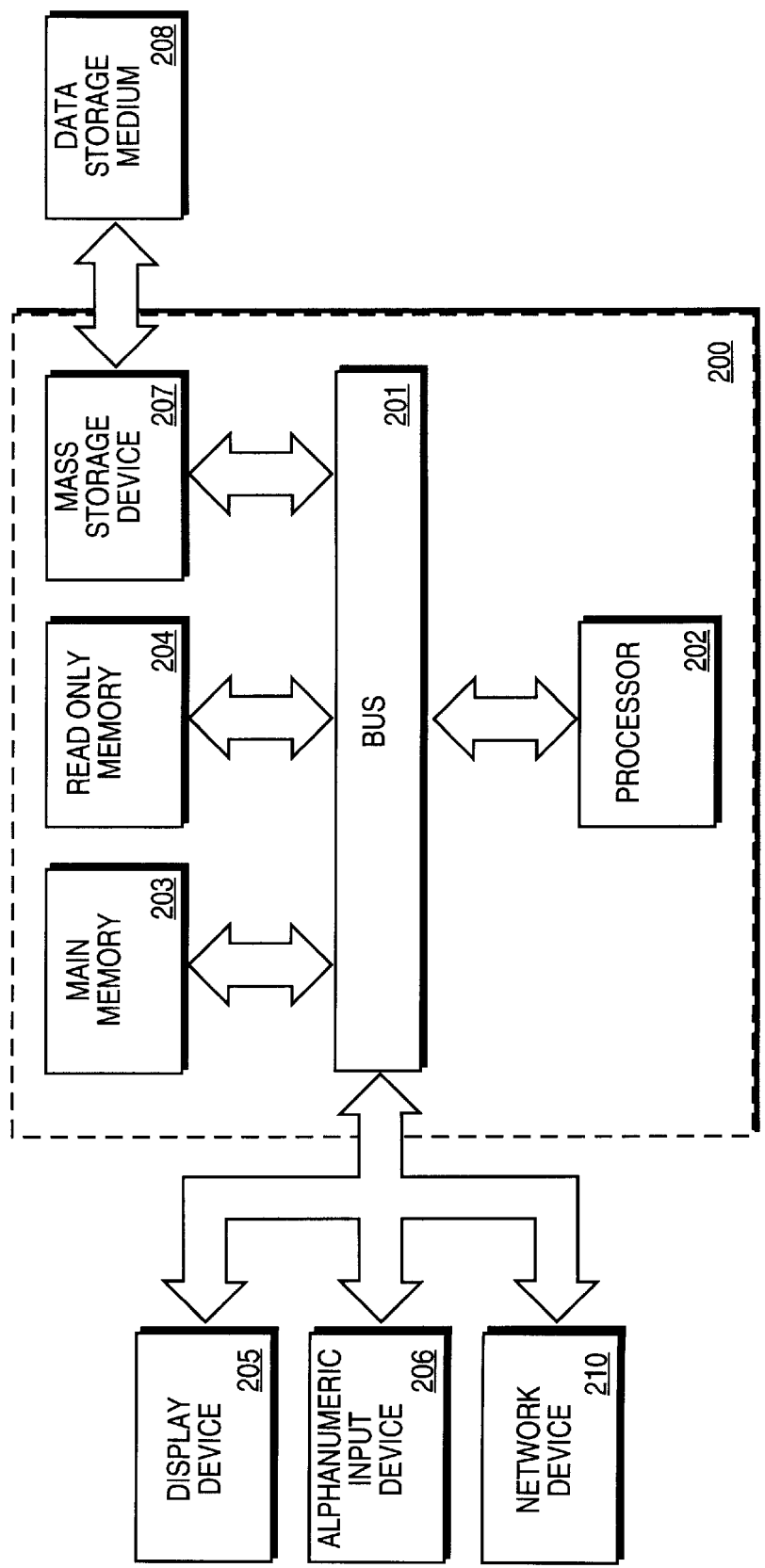
FIG. 2 illustrates a computer system that may be utilized in the present invention.

FIG. 2 illustrates a typical computer system 200 in which the present invention operates. The preferred embodiment of the present invention is implemented on an IBMυ Personal Computer manufactured by IBM Corporation of Armonk, N.Y. It will be apparent to those of ordinary skill in the art that other alternative computer system architectures may also be employed.

In general, such computer systems as illustrated by FIG. 2 comprise a bus 201 for communicating information, a processor 202 coupled with the bus 201 for processing information, main memory 203 coupled with the bus 201 for storing information and instructions for the processor 202, a read-only memory 204 coupled with the bus 201 for storing static information and instructions for the processor 202, a display device 205 coupled with the bus 201 for displaying information for a computer user, an input device 206 coupled with the bus 201 for communicating information and command selections to the processor 202, and a mass storage device 207, such as a magnetic disk and associated disk drive, coupled with the bus 201 for storing information and instructions. A data storage medium 208 containing digital information is configured to operate with mass storage device 207 to allow processor 202 access to the digital information on data storage medium 208 via bus 201.

Processor 202 may be any of a wide variety of general purpose processors or microprocessors such as the Pentium® microprocessor manufactured by Intel® Corporation. It will be apparent to those of ordinary skill in the art, however, that other varieties of processors may also be used in a particular computer system. Display device 205 may be a liquid crystal device, cathode ray tube (CRT), or other suitable display device. Mass storage device 207 may be a conventional hard disk drive, floppy disk drive, CD-ROM drive, or other magnetic or optical data storage device for reading and writing information stored on a hard disk, a floppy disk, a CD-ROM a magnetic tape, or other magnetic or optical data storage medium. Data storage medium 208 may be a hard disk, a floppy disk, a CD-ROM, a magnetic tape, or other magnetic or optical data storage medium.

In general, processor 202 retrieves processing instructions and data from a data storage medium 208 using mass storage device 207 and downloads this information into random access memory 203 for execution. Processor 202, then executes an instruction stream from random access memory 203 or read-only memory 204. Command selections and information input at input device 206 are used to direct the flow of instructions executed by processor 202. Equivalent input device 206 may also be a pointing device such as a convention al mou s e, trackball, trackpad, joystick, cursor control keys and stylus. The results of this processing execution are then displayed on display device 205.

Computer system 200 includes a network device 210 for connecting computer system 200 to a network via a modem or other mode of communication. Network device 210 for connecting computer system 200 to the network includes Ethernet devices, phone jacks and satellite links. Network device 210 generally communicates with a network via a modem. It will be apparent to one of ordinary skill in the art that other network devices and modes of communication may also be utilized.

One embodiment of the present invention is implemented as a software module, which may be executed on a computer system such as computer system 200 in a conventional manner. Using well known techniques, the application software of one embodiment is stored on data storage medium 208 and subsequently loaded into and executed within computer system 200. Once initiated, the software of the preferred embodiment operates in the manner described below.

Figure 3A:
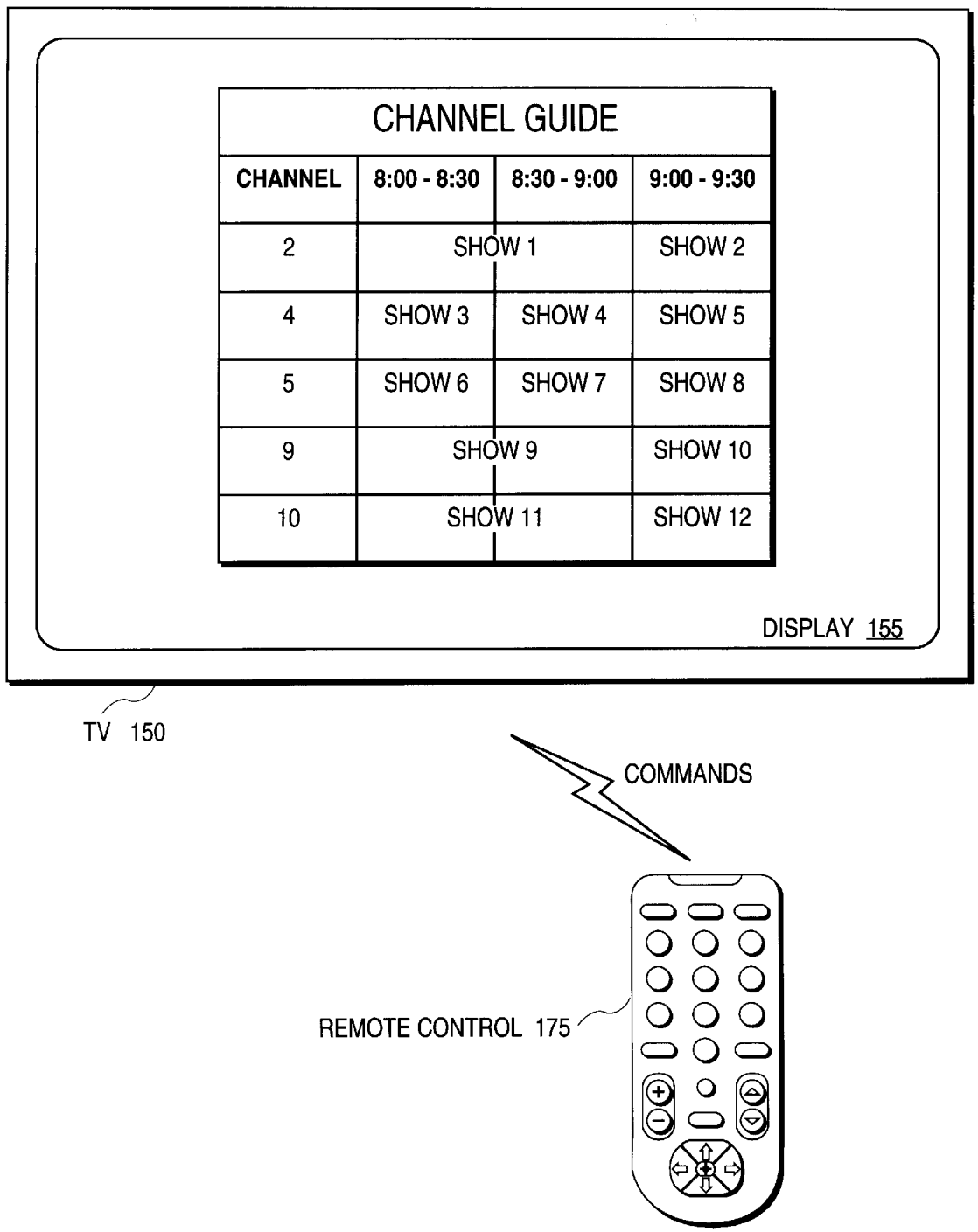
FIG. 3A illustrates a prior art television program listing available on a television.

FIG. 3A illustrates a prior art television program listing, available for viewing on a television. The television program listing is displayed on TV 150, within display 155 and generally includes a column indicative of the channel and a row indicative of a time slot. For example, the television program listing indicates that on channel 4, for example, the television show "SHOW3" can be viewed between 8:00 and 8:30. It will be apparent to one of ordinary skill in the art that other formats may also be available for the television program listing display.

This television program listing is generally well known to all users who use a television. It is well-known in the art that remote control 175 can be used to send commands to TV 150, and that the television program listing may appear on one of the available channels. In this way, a user may easily find a television program listing to determine the programming available for that region. This intuitive user interface remains the same regardless of the type of TV or the city in which the user is currently in.

Figure 3B:
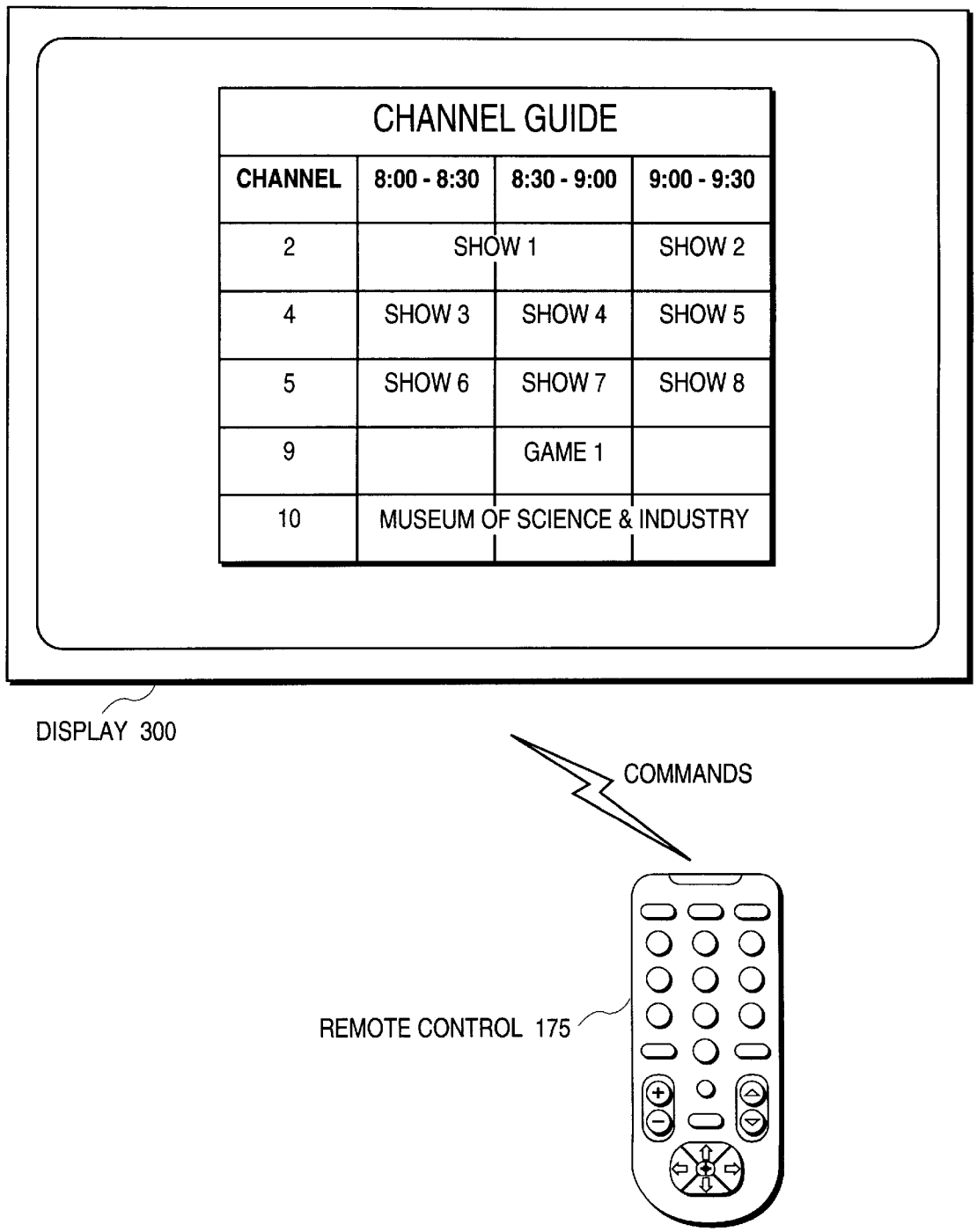
FIG. 3B illustrates one embodiment of the present invention as implemented in a television program listing.

FIG. 3B illustrates one embodiment of the method and apparatus for merging, displaying and accessing PC content listings via a television user interface. At least one PC content listing is formatted into a television content listing format. The PC content listing is then displayed in a television program listing format. As illustrated in FIG. 3B, formatted PC content listings can also be merged with standard television program listings prior to display. This listing can include links to Web pages, message management systems, video conferences, local video games and on-line video games. It will be apparent to one of ordinary skill in the art that any other type of PC content can also be included in this program listing.

For example, channels 9 and 10 on the program listing in FIG. 3B do not include standard television programming, but rather display information pertaining to Web sites. Channel 9 displays that between 8:00 and 9:30, an online game of "GAME1" is taking place. Meanwhile, channel 10 displays a listing for "Museum of Science & Industry," corresponding to the www.museum.com website. According to one embodiment of the present invention, just as a user would select channel 4 at 8:00 p.m. in order to view "SHOW3", the user may select channel 10 at 8:00 p.m. in order to be presented with the Museum of Science & Industry exhibits. This is the equivalent of a user on a PC system utilizing a Web browser, entering a URL in order to access www.museum.com. Similarly, channel 9, if selected by a user, will display an Game1. The user selects channels 9 or 10 in the same way that the user of a prior art television system illustrated in FIG. 3A would select any other channel, namely via remote control 175. The user may select the channel either by an "absolute addressing" method, namely by entering the number of the channel on the remote control, or by a "relative addressing" method where the user merely hits the "channel up" or "channel down" buttons on the remote control.

This merging of television program listings with PC content listings provides users with a simplified, intuitive user interface to access content on PCs. Instead of requiring a user to learn a PC user interface, the user can now utilize a remote control similar to the currently available remote control for televisions. The replacement of a standard television set with the system according to one embodiment of the present invention will not be apparent to the user because standard television programming will be displayed without interruptions or modifications. The user simply has more information available to him/her via this familiar television user interface than he/she did in prior standard television systems.

Figure 4:
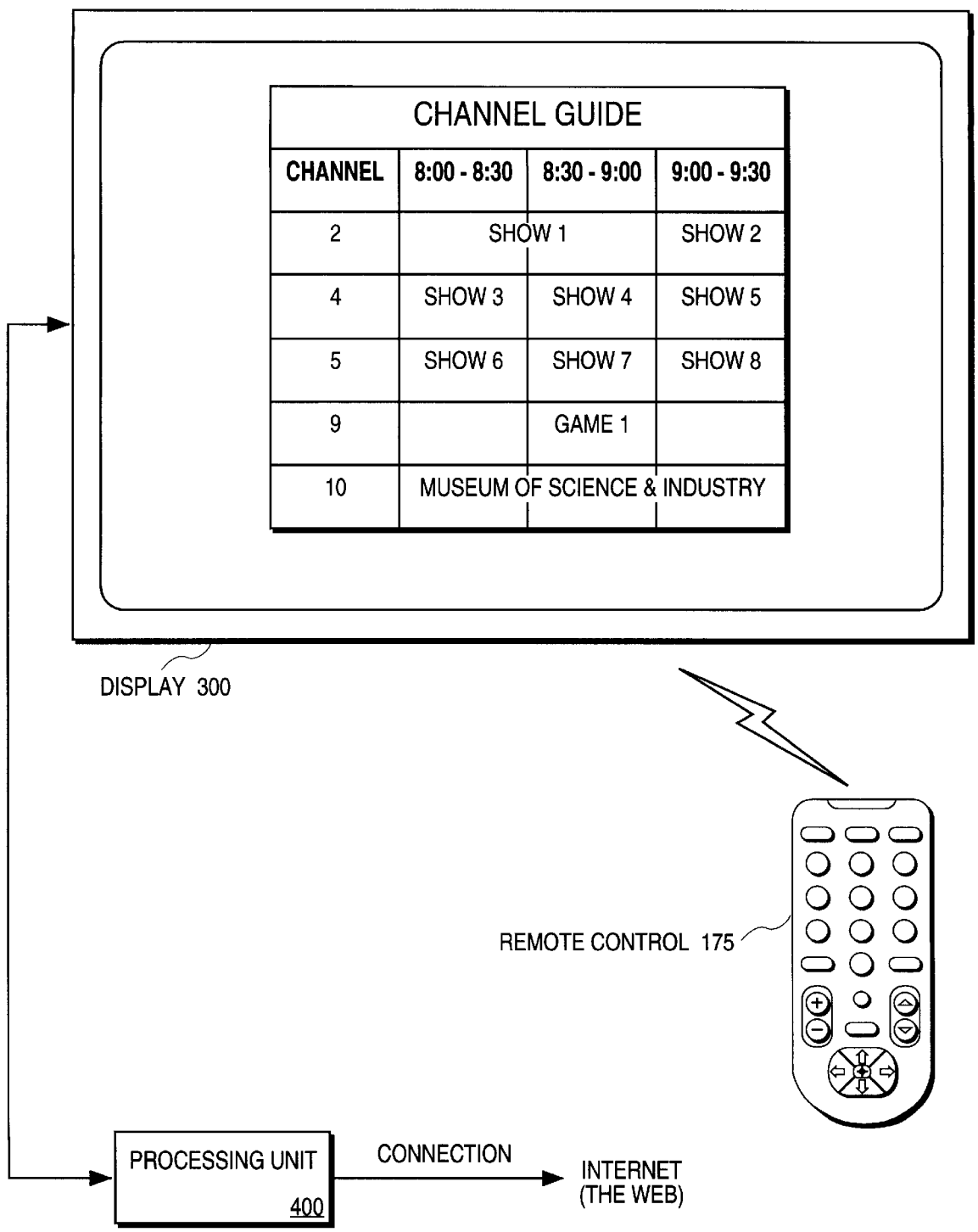
FIG. 4 illustrates one embodiment of a system utilizing the present invention.

FIG. 4 illustrates the method and apparatus of the present invention in further detail. Display 300 is coupled to processing unit 400 and is controlled via remote control 175. As illustrated in FIG. 4, processing unit 400 is capable of making a connection to the Internet, Processing unit 400 may be a computer system such as illustrated in FIG. 2 or any other form of processing unit that can perform the functions required to access a television channel and a PC. Display 300 replaces the television set in the user's living room, and can be utilized for all normal television viewing as well as to access PC content.

Figure 5A:
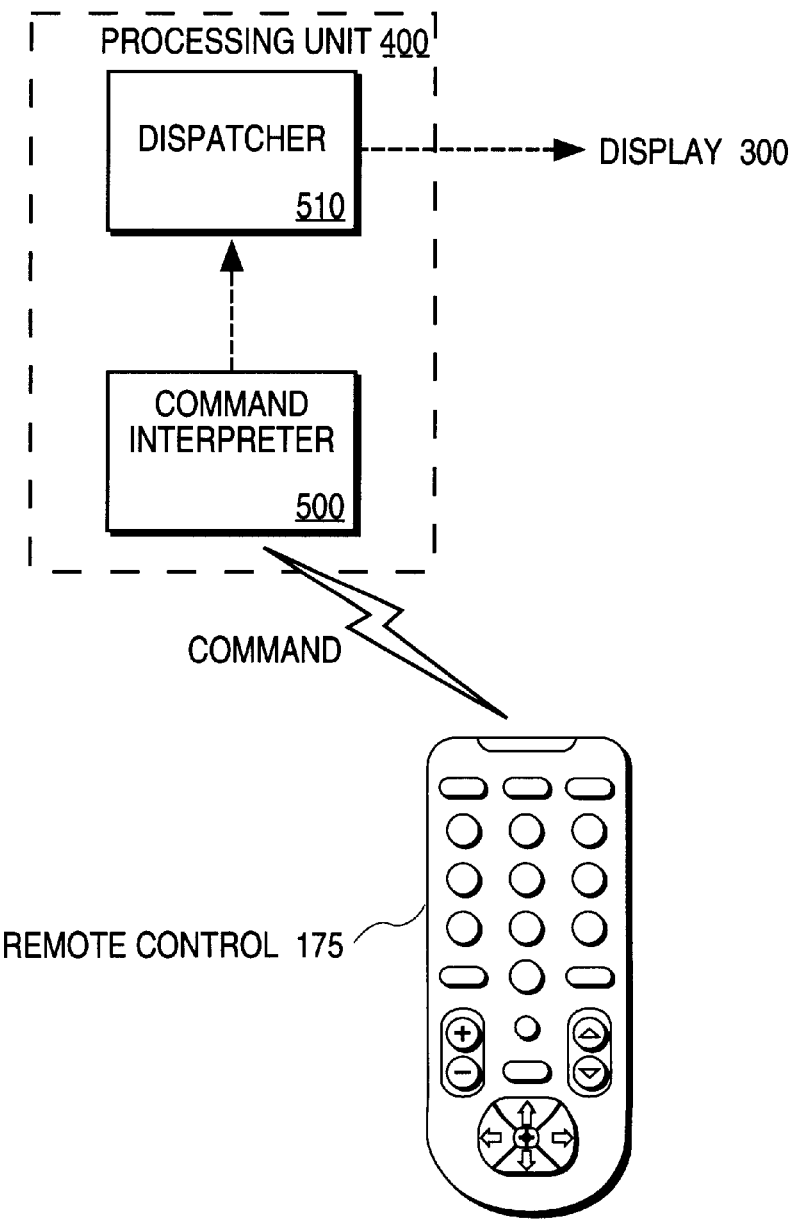
FIG. 5A illustrates in more detail one embodiment of the present invention.
Figure 5B:
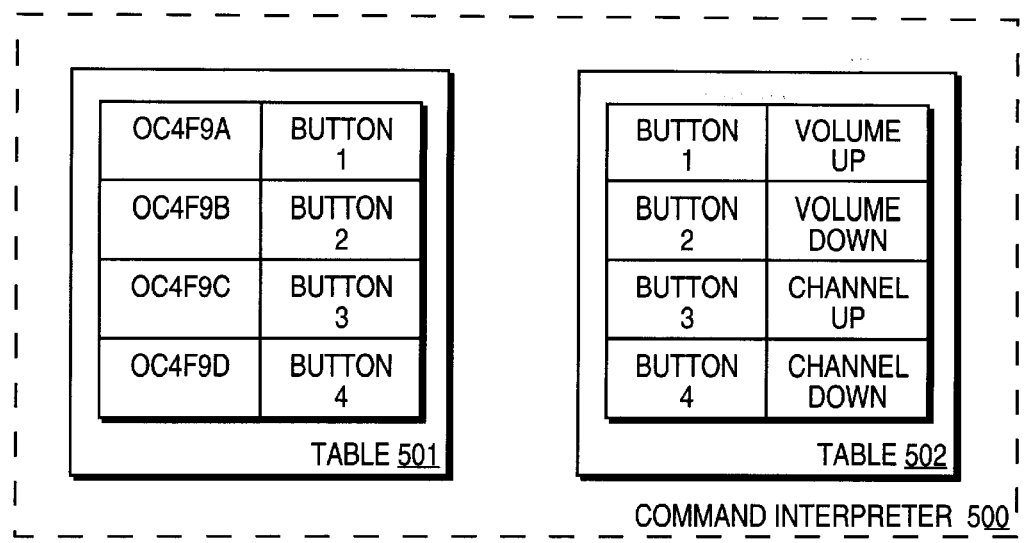
FIG. 5B illustrates in more detail the command interpreter of the present invention.
Figure 5C:
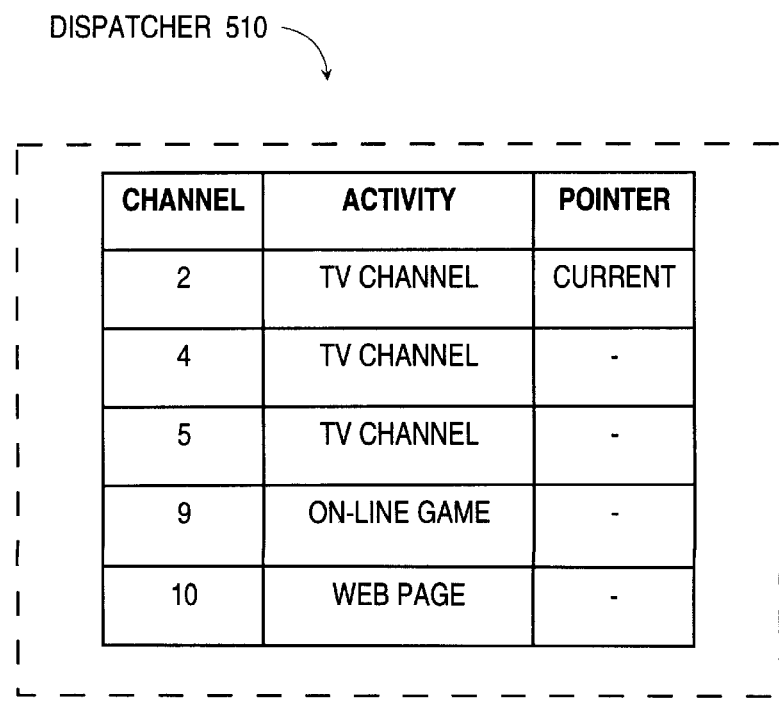
FIG. 5C illustrates in more detail the dispatcher of the present invention.

FIGS. 5A–5C illustrate the functionality provided by processing unit 400 in order to implement one embodiment of the present invention. FIG. 5A illustrates processing unit 400 including a command interpreter 500 and a dispatcher 510. Commands from remote control 175 are processed by both command interpreter 500 and dispatcher 510, and the output of the processing is displayed on display 300.

FIG. 5B illustrates the command interpreter 500 in more detail. Specifically, command interpreter 500 maintains two tables, table 501 and table 502. Table 501 performs the function of converting the bits that are received from remote control 175 into a corresponding button on the remote control. For example, as illustrated, the bits "0C4P9A" correspond to button 1 on the remote control. Unfortunately, however, button 1 does not have a meaning to the command interpreter 500 until the command interpreter can determine the functionality of button 1. Table 502 maintains information that allows command interpreter 500 to translate the buttons into their corresponding functionality. For example, as illustrated, button 1 corresponds to a "volume up" button, Command interpreter 500 thus knows that if it receives bits 0C4F9A from remote control 175, the user has just pressed the "volume up" button on remote control 175. It will be apparent to one of ordinary skill in the art that command interpreter 500 may also be implemented in other ways that achieve the same result as described above.

FIG. 5C illustrates dispatcher 510 in more detail. Dispatcher 510 is a data structure that includes information about the type of activity that is available on each of the channels displayed in the television program listing in display 300. Dispatcher 510 also includes a pointer that informs processing unit 400 of the current channel being viewed by the user, in this case channel 2 which is a TV channel. If the user selects channel 10, for example, the pointer will move to channel 10, thus telling processing unit 400 that channel 10 is displaying a Web page. In this situation, processing unit 400 knows that it has to establish a connection to the Web in order for the user to view the Web page selected on channel 10. It will be apparent to one of ordinary skill in the art that dispatcher 510 may also be implemented in other ways that achieve the same result as described above.

The above description addresses the scenario of a user utilizing an already programmed television program listing. When a user attempts to use an embodiment of the present invention for the first time, however, PC content listings will not yet be merged with the television program listing. During this first session, the user may be presented with the cable TV carrier's Web page, for example, that includes various PC content and corresponding channels. This Web page may be presented on an unused standard TV channel or a "phantom" channel that will never be utilized by the cable TV carrier. The Web page may be presented automatically if the cable TV carrier is adapted to identify itself to the system. Otherwise, the user may have to specify its cable TV carrier in order to access the carrier's Web page.

The channels listed are predetermined by the cable TV provider, and the user merely selects the content and corresponding channels that he wishes to include in his own personalized listing. Additionally, the user can also manually add other Web sites or other PC content by typing in the information, and the additional PC content will be assigned a corresponding channel. The user may change these assigned channels, if the user so desires. This additional PC content is the user's "local" listing, namely a listing that is available only to this user. The user's final personalized listing may look like the listing illustrated in FIG. 3B. The listings may also be presented in alternative listing formats.

The above embodiment presents the user with a single merged listing of PC content listings and television program listings. Alternately, the user may be presented with two separate listings on separate channels. In this way, the user may be able to utilize a standard television set, without the processing capability described in the currently claimed invention. The user will, however, still be able to take advantage of the TV user interface paradigm described in the currently claimed invention.

The cable TV carrier's predetermined channels may be downloaded periodically and merged with the user's local listing. This downloading process may be scheduled to occur automatically in a manner well known in the art. The merging of the downloaded listing with the user's local listing can be achieved in a number of ways. For example, Intel's Intercast technology may be utilized to transmit the cable TV carrier's program listings over the Vertical Blanking Interval (VBI) portion of the television transmission. Similar to a closed-caption transmission, the program listing is then extracted by a decoder, and processing unit 400 merges the listing with the user's local listing.

Alternatively, the cable TV carrier's Web page containing the predetermined channel listing may be downloaded to processing unit 400. Processing unit 400 then parses the Web page and merges the parsed information with the user's local listing. It will be apparent to one of ordinary skill in the art that other methods of merging the information may also be utilized.

Figure 6:
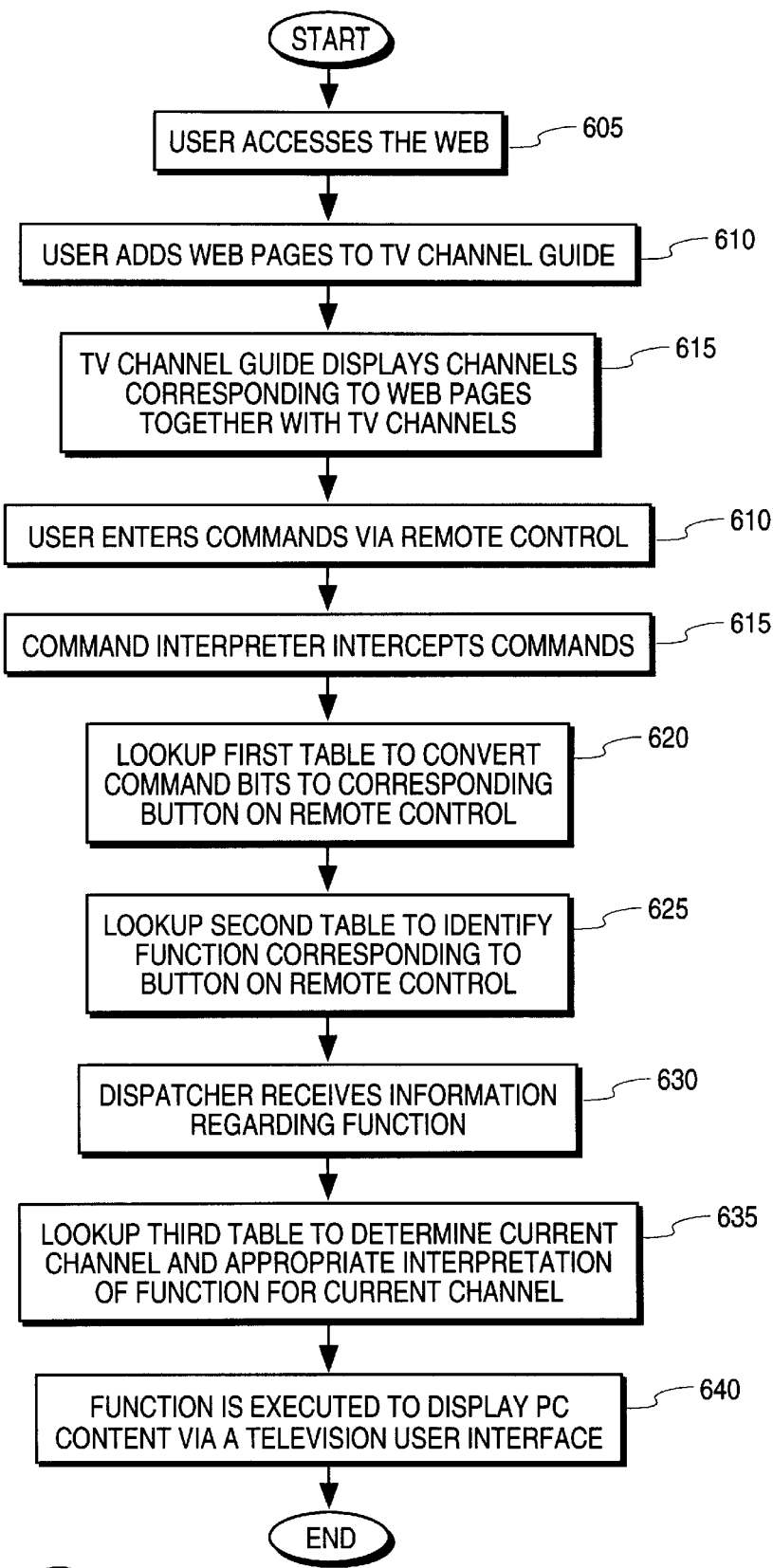
FIG. 6 is a flowchart illustrating one embodiment of the present invention.

FIG. 6 is a flowchart illustrating the entire process described above. In step 605 a user accesses PC content and adds PC content to the TV television program listing in step 610. In step 615, the TV television program listing displays channels corresponding to PC content together with TV channels, as illustrated in FIG. 5A. The user enters commands via a remote control in step 610, and the command interpreter intercepts these commands in step 615. The command interpreter looks up a first table to convert command bits from the remote control to determine corresponding buttons on the remote control in step 620. The command interpreter then looks up a second table to identify the function corresponding to the button on the remote control in step 625. In step 630, the dispatcher receives information regarding the function on the remote control button and in step 635, the dispatcher looks up a third table to determine the current channel and appropriate interpretation of the function for the current channel. Finally, in step 640, the function is executed to present the user with PC content via a television user interface.

Thus, a method and apparatus for merging, displaying and accessing personal computer content via a television interface is disclosed.

I claim:

1. A method for merging and displaying television content listings with PC content listings of a Personal Computer (PC) comprising:

formatting at least one PC content listing into a television content listing format;

merging said at least one PC content listing with at least one television content listing; and displaying said at least one PC content listing on said display device with at least one television content listing.

2. The method according to claim 1 wherein said at least one PC content listing is displayed on a channel unused by said television content listing.

3. The method according to claim 1 further comprising:

receiving input from a remote control; and processing said input to perform a predetermined action.

4. The method according to claim 3 wherein processing said input to perform said predetermined action includes processing said input to change a channel.

5. The method according to claim 4 wherein processing said input to change said channel includes selecting one of a group consisting of a Web page, a message management system, a video conference, a local video-game and an on-line video game.

6. The method according to claim 5 wherein the process of selecting is performed via at eevision user interface.

7. An apparatus for merging and displaying PC content listings, said apparatus comprising:

a processing unit for formatting at least one PC content listing into a television content listing format, and merfnr said at least one PC content listing with at least one television content listing; and a display device coupled to said processing unit to display said at least one PC content listing on said display device.

8. The apparatus according to claim 7 wherein at least one PC content listing is displayed on a channel unused by said television content listing.

9. The apparatus according to claim 7 further comprising:

a remote control, wherein said processing unit receives input from said remote control; and said processing unit processing said input to perform a predetermined action.

10. The apparatus according to claim 9 further comprising:

said processing unit processing said input to change a channel.

11. The apparatus according to claim 10 wherein said processing unit further selects one of a group consisting of a Web page, a message management system, a video conference, a local video-game and an on-line video game.

12. The apparatus according to claim 11 wherein said processing unit selects via a television user interface.

13. A method for accessing PC content listings via a television user interface comprising the steps of:

inputting a command into a remote control to access a PC content listing or a television content listing, wherein said PC content listing is merged with and displayed on said television user interface with said television content listing;

transmitting said command from said remote control to a processing unit;

said processing unit interpreting said command into a corresponding action; and executing said corresponding action to present said PC content listings on a display device via said television user interface using activity information, wherein said activity information provides regarding the type of activity available on each of a plurality of channels on information said display device.

14. The method according to claim 13 wherein interpreting said command into said corresponding action further includes:

converting said command from bits received from said remote control into a corresponding button on said remote control; and translating said corresponding button into predetermined functionality.

15. The method according to claim 14 wherein executing said corresponding action includes performing said predetermined functionality of said corresponding button.

16. The method according to claim 15 wherein performing said predetermined functionality of said corresponding button includes changing a television channel.

17. The method according to claim 16 wherein changing said television channel is performed as an absolute address.

18. The method according to claim 16 wherein changing said television channel is performed as a relative address.

19. An apparatus for accessing PC content listings via a television user interface comprising:

a display device;

a processing unit coupled to said display device, wherein said processing unit includes information regarding the type of activity available on each of a plurality of channels on said display device, said plurality of channels including at least one channel comprising PC content and at least one channel comprising television content wherein content listings of said at least one channel comprising PC content and content listings of said at least one channel comprising television content are merged and displayed at said display device; and a remote control coupled to said processing unit for selecting one of said plurality of channels based on said content listings, wherein said processing unit receives a command from said remote control;

wherein said processing unit interprets said command into a corresponding action and executes said corresponding action using said activity information to present said PC content listings on said display device.

20. The apparatus according to claim 19 wherein said processing unit further converts said command from bits received from said remote control unit into a corresponding button on said remote control and translates said corresponding button into predetermined functionality.

21. The apparatus according to claim 20 wherein said processing unit executes said corresponding action by performing said predetermined functionality of said corresponding button.

22. The apparatus according to claim 21 wherein said processing unit changes a television channel.

23. The apparatus according to claim 22 wherein said television channel is changed as an absolute address.

24. The apparatus according to claim 22 wherein said television channel is changed as a relative address.

* * * * *

UNITED STATES PATENT AND TRADEMARK OFFICE
CERTIFICATE OF CORRECTION

PATENT NO.    : 6,144,376
DATED         : November 7, 2000
INVENTOR(S)   : Connelly It is certified that error appears in the above-identified patent and that said Letters Patent is hereby corrected as shown below:

Column 7,
Line 6, before "content listings", delete -- PC --.
Line 35, delete "merfnr", insert -- merging --.

Signed and Sealed this

Twentieth Day of August, 2002

Attest:

JAMES E. ROGAN
Attesting Officer        Director of the United States Patent and Trademark Office